UNITED STATES PATENT OFFICE.

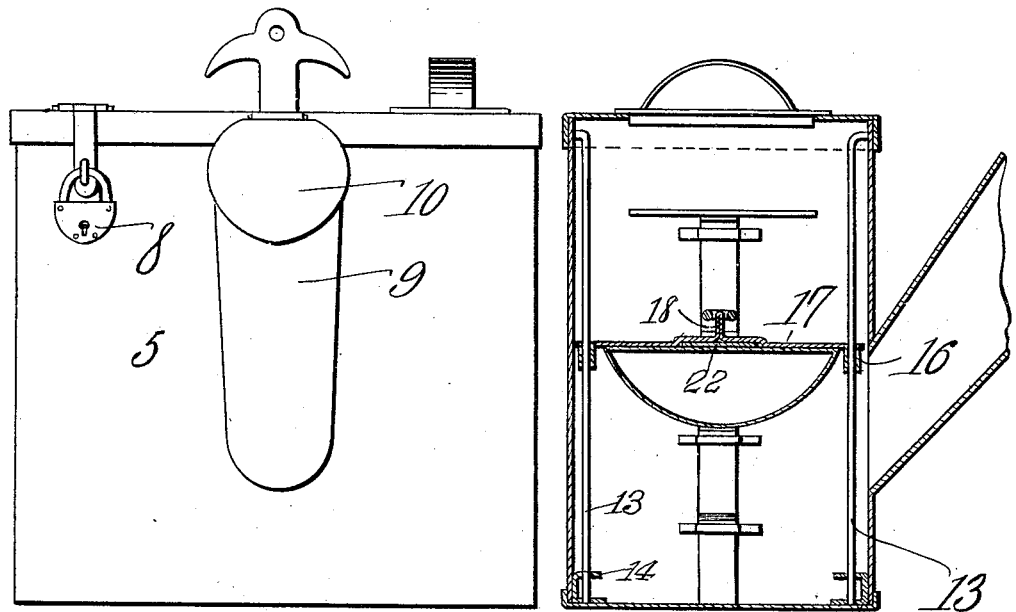
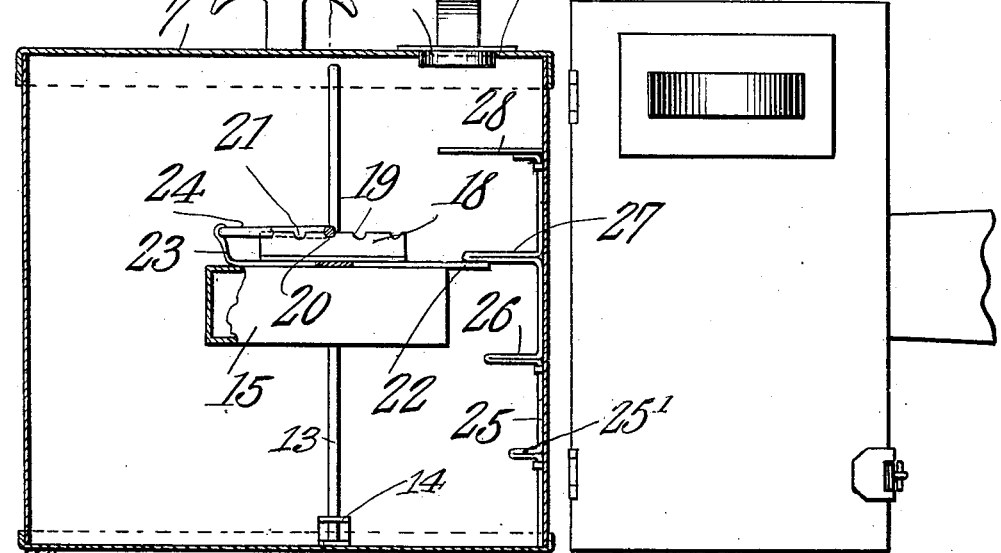

BARTHELEMIY LEFLEUR, OF VANCOUVER, BRITISH COLUMBIA, CANADA.

MILK-CAN.

977,660.  Specification of Letters Patent.  Patented Dec. 6, 1910.

Application filed April 16, 1910. Serial No. 555,791.

*To all whom it may concern:*

Be it known that I, BARTHELEMIY LE-FLEUR, a subject of the King of England, residing at Vancouver, in the Province of British Columbia, Canada, have invented a new and useful Milk-Can, of which the following is a specification.

It is the object of the present invention to provide a milk receptacle of that type designed to be supported upon or near the door of a house or store and into which the milkman may pour the desired quantity of milk, the receptacle being so constructed that unlicensed removal of the milk cannot be accomplished.

One aim of the invention is to so construct the device that the money to pay for the milk to be delivered may be placed within a portion of the receptacle from which it may be removed by the milkman at the time of delivering the milk.

A further aim of the invention is to provide within the receptacle of the device, a float actuated coin supporting means which, when the proper quantity of milk has been poured into the receptacle, will be brought to position directly at an opening in the top wall of the receptacle in such position that the coin or coins may be removed by the milkman. The float or actuating means for this coin supporting means of the device may be readily adjusted by the customer so that the coin supporting means will be brought to proper position with relation to the opening in the top of the receptacle, when the desired quantity of milk has been poured into the receptacle.

With the above and other objects in view, the invention consists in the construction and arrangement of parts shown in the accompanying drawings, in which,—

Figure 1 is a view in front elevation of the device. Fig. 2 is a vertical transverse sectional view therethrough. Fig. 3 is a vertical sectional view taken in a plane from front to rear on the line 3—3 of Fig. 2, and Fig. 4 is a top plan view of the receptacle.

In the drawings, the body of the receptacle is indicated by the numeral 5 and while it is here shown as rectangular in form, it may equally as well assume some other shape. At its rear and midway between its ends, the body 5 is provided with an upstanding hanger 6 by which the receptacle may be suspended upon any suitable support. The upper end of the receptacle is closed by a hinged cover 7 secured by a lock 8. A spout 9 projects forwardly upwardly from the front wall of the receptacle to a level with the top of the receptacle, and this spout is closed by a hinged cover 10 which may be readily opened, however, both to permit the milkman to pour the milk to be delivered, into the receptacle, and to permit of the milk being readily poured from the receptacle by the customer, after its delivery. For a purpose to be presently explained, the cover 7 for the body has at one side, preferably the right hand side, an opening 11 closed by a movable lid 12.

As heretofore stated, there is provided a float actuated means for supporting the coin which is to pay for the milk to be delivered by the milkman, the object in view in providing such means being to enable the milkman to remove the coin only after the proper quantity of milk has been poured into the receptacle, and such means will now be described.

A rod 13 is mounted behind the front wall and one in front of the rear wall of the receptacle and these rods have their lower ends seated in brackets 14 at the bottom of the receptacle and their upper ends secured to the front and rear walls respectively. A float 15 is provided at its front and rear with guides 16 which slide upon the rods 15 so that the float may rise and fall. Upon the top of the float there is secured a plate 17 the intermediate portion of which is bent upon itself to form an upstanding flange 18 having notches 19, 20 and 21 in its upper edge. A strip 22 slides between the plate 17 and the top wall of the float 15. The left hand end of this strip in Fig. 2 of the drawings is bent to extend upwardly and has pivoted to it a bail 24 which may rest by gravity in engagement with any one of the notches 19, 20 or 21, depending upon the position of the strip 22.

Secured in upright position upon the right hand end wall of the body 5 of the receptacle for vertical sliding movement, is a strip 25 which is folded upon itself to form abutments 25′, 26 and 27, the upper end of the strip supporting a shelf 28 which shelf is located below the opening 11 and is exposed to view when the cover 12 for the said opening is removed, this shelf being the means for supporting the money which is to pay for the milk delivered. Of the three abutments, the one 25' projects inwardly from the said wall of the body of the receptacle a less distance than the abutment 26, and the said abutment 26 in turn projects inwardly from the said wall a distance less than does the abutment 27; the abutment 25' being the lowermost one of the three.

If the bail 24 is so adjusted together with the strip 22, that it will engage in the notch 19, then the end of the said strip 22 opposite that end at which the bail is pivoted, will engage the abutment 25' and in turn, the bail and strip are so adjusted that the bail will rest in the notch 20, and the said end of the strip will engage the abutment 26 although it will escape the abutment 25'. The same is true of the relation of the strip and the shelf when the bail rests in the notch 21. Thus it will be seen that while normally the float will rest upon the bottom of the receptacle, should a gallon of milk be poured into the receptacle (considering a gallon as a unit of measuring in the present instance) the bail being in engagement with the notch 19, the extremity of the strip 22 will come into contact with the abutment 25' and further movement of the float in an upward direction will result in a corresponding movement of the strip 25 until the shelf 28 will be positioned directly at the opening in the top or cover of the receptacle at which time the coin upon the said shelf will be in convenient position for removal by the milkman. It will also be understood that when the shelf comes into engagement with the under side of the cover 7, further upward movement of the float and the strip will be prevented and thus the said means will serve also as a means for indicating to the milkman the fact that he has introduced into the receptacle the proper quantity of milk.

From the foregoing description of the invention it will be readily understood that the same provides means whereby a milkman may be paid automatically for the delivery of a predetermined quantity of milk, but not before such quantity has been actually delivered. Also it will be understood that the means provided serves also as a means for indicating to the milkman, when the shelf comes to proper position with respect to the opening in the cover, that the desired quantity of milk has been introduced into the receptacle.

What is claimed is:

1. In a device of the class described, a receptacle provided with an opening, a coin support arranged for movement in the receptacle with respect to said opening, and float means arranged to coöperate with the said coin supporting means to bring the same to juxtaposition with said opening.

2. In a device of the class described, a receptacle provided with an opening, coin supporting means arranged in the receptacle, said means being movable to position beneath said opening, and a float arranged to so move said coin supporting means.

3. In a device of the class described, a receptacle provided with an opening, a coin support arranged within the receptacle and normally removed from said opening, and a float within the receptacle arranged to move said coin supporting means to position at such opening.

4. In a device of the class described, a receptacle, coin presenting means within the receptacle, and float means for actuating the said coin presenting means.

5. In a device of the class described, a receptacle, the said receptacle being formed in its top with an opening, a coin supporting means arranged for vertical sliding movement in the receptacle from position remote from to position at said opening, abutments upon the member, and a float having means adjustable to engage said abutments selectively whereby to so move said coin supporting means when the receptacle has been filled to a predetermined degree.

In testimony that I claim the foregoing as my own, I have hereto affixed my signature in the presence of two witnesses.

BARTHELEMIY LEFLEUR.

Witnesses:
　DAMASE LEROUX,
　EDWARD CLOUGH.